(12) United States Patent
Ogaki et al.

(10) Patent No.: US 12,126,933 B2
(45) Date of Patent: Oct. 22, 2024

(54) IMAGING APPARATUS, CONTROL METHOD THEREOF, AND STORAGE MEDIUM

(71) Applicant: CANON KABUSHIKI KAISHA, Tokyo (JP)

(72) Inventors: Koji Ogaki, Kanagawa (JP); Michinori Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 17/817,915

(22) Filed: Aug. 5, 2022

(65) Prior Publication Data

US 2023/0049382 A1 Feb. 16, 2023

(30) Foreign Application Priority Data

Aug. 10, 2021 (JP) ................................. 2021-130636

(51) Int. Cl.
| | |
|---|---|
| *H04N 5/91* | (2006.01) |
| *H04N 5/272* | (2006.01) |
| *H04N 23/60* | (2023.01) |
| *H04N 23/63* | (2023.01) |

(52) U.S. Cl.
CPC ............... *H04N 5/91* (2013.01); *H04N 5/272* (2013.01); *H04N 23/60* (2023.01); *H04N 23/633* (2023.01)

(58) Field of Classification Search
CPC .......... H04N 5/91; H04N 5/272; H04N 23/60; H04N 23/633; G06F 3/0488; G06F 3/04845
See application file for complete search history.

(56) References Cited

U.S. PATENT DOCUMENTS

| | | | |
|---|---|---|---|
| 2015/0181135 A1* | 6/2015 | Shimosato | ........... H04N 23/635 348/239 |
| 2020/0366852 A1* | 11/2020 | Ueno | .................... H04N 23/632 |
| 2021/0235022 A1* | 7/2021 | Kitai | .................... H04N 23/633 |

FOREIGN PATENT DOCUMENTS

JP 2003037770 A 2/2003

* cited by examiner

*Primary Examiner* — Timothy J Henn
(74) *Attorney, Agent, or Firm* — Canon U.S.A., Inc. IP Division

(57) ABSTRACT

An imaging apparatus includes an imaging unit, an operation unit configured to be operated by an operation in a first phase and an operation in a second phase, a recording control unit configured to record a moving image captured by the imaging unit in a moving image file in response to an operation performed on the operation unit, and a control unit configured to perform control to cause the imaging apparatus to display file information about the moving image file to be recorded by the recording control unit in response to performance of the operation in the first phase, and to cause the imaging apparatus to hide the file information that is displayed in response to the performance of the operation in the first phase, in response to performance of the operation in the second phase.

13 Claims, 6 Drawing Sheets

FIG.6A
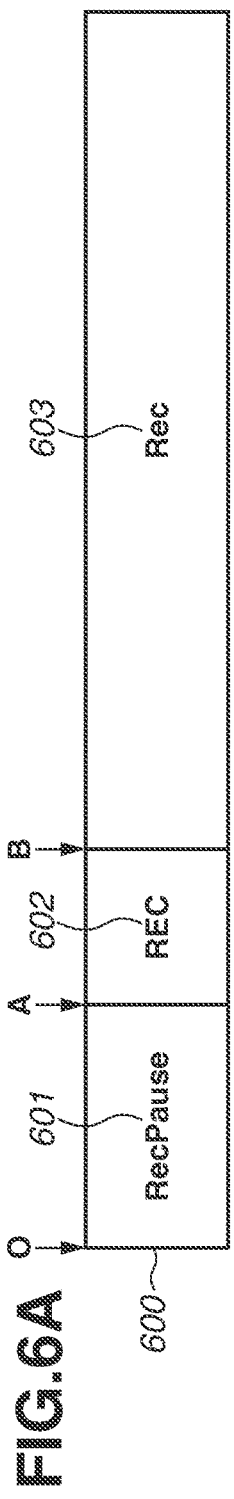
FIG.6B-1
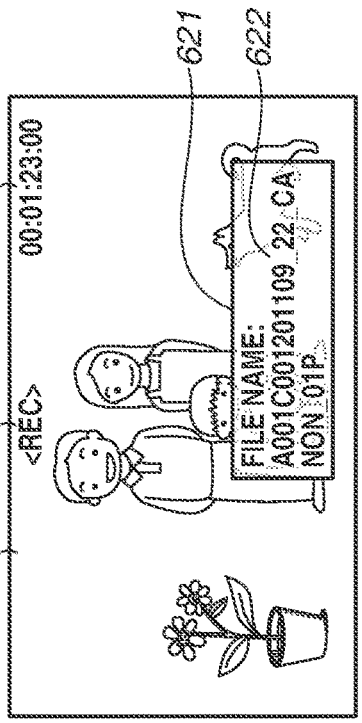
FIG.6B-2
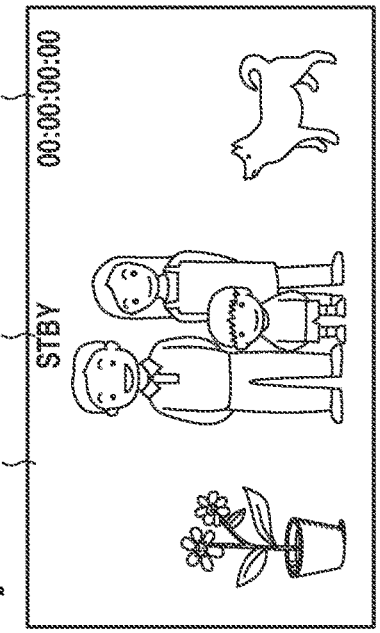
FIG.6B-3
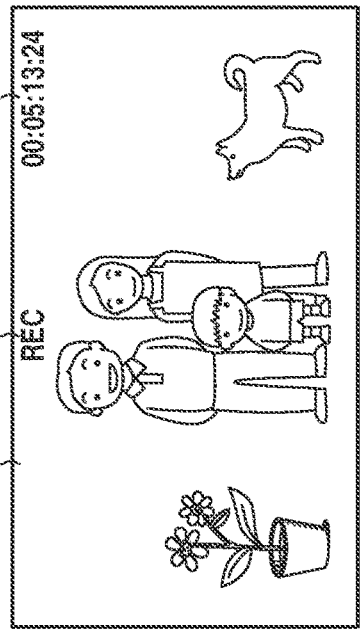

IMAGING APPARATUS, CONTROL METHOD THEREOF, AND STORAGE MEDIUM

BACKGROUND OF THE DISCLOSURE

Field of the Disclosure

The present disclosure relates to display control of an imaging apparatus for recording moving images, which is performed when an operation member that supports a two-phased operation is operated.

Description of the Related Art

File information (e.g., file name) about a recorded video image is considered to be an important element in the field of recording moving images in general. The function of displaying file information is carried out even in recording the moving image. However, constantly displaying file information on the display unit can be an obstacle in checking a live view image or other information. Japanese Patent Application Laid-Open No. 2003-037770 discusses a technique of capturing a specific video image before starting image capturing (recording), determining whether a specific character can be recognized from the video image, if recognized, displaying the recognized character on a display unit and, using the character as the file name. That technique enables a user to visually check characters used as a file name, the characters of which is a file name.

However, if the character is not recognizable, the technique discussed in Japanese Patent Application Laid-Open No. 2003-037770 does not display the character to be used as a file name. That prevents the user from checking the file information such as a file name when the user wishes to check before image capturing (recording) is started.

SUMMARY OF THE DISCLOSURE

The present disclosure is directed to a technique that enables a user to check information relating to recording of a moving image without having any difficulty before recording of the moving image is started.

According to an aspect of the present disclosure, an imaging apparatus includes an imaging unit, an operation unit configured to be operated by an operation in a first phase and an operation in a second phase, a recording control unit configured to record a moving image captured by the imaging unit in a moving image file in response to an operation performed on the operation unit, and a control unit configured to perform control to cause the imaging apparatus to display file information about the moving image file to be recorded by the recording control unit in response to performance of the operation in the first phase, and to cause the imaging apparatus to hide the file information that is displayed in response to the performance of the operation in the first phase, in response to performance of the operation in the second phase.

Further features of the present disclosure will become apparent from the following description of exemplary embodiments with reference to the attached drawings.

BRIEF DESCRIPTION OF THE DRAWINGS

FIG. 4A and FIGS. 4B-1 to 4B-3 illustrate a state of the digital camera in recording a moving image and display examples thereof according to the first exemplary embodiment.

FIG. 6A and FIGS. 6B-1 to 6B-3 illustrate a state of the digital camera in recording a moving image and display examples thereof according to the second exemplary embodiment.

DESCRIPTION OF THE EMBODIMENTS

Hereinafter, some exemplary embodiments of the present disclosure will be described with reference to the appended drawings.

Figure 1A:
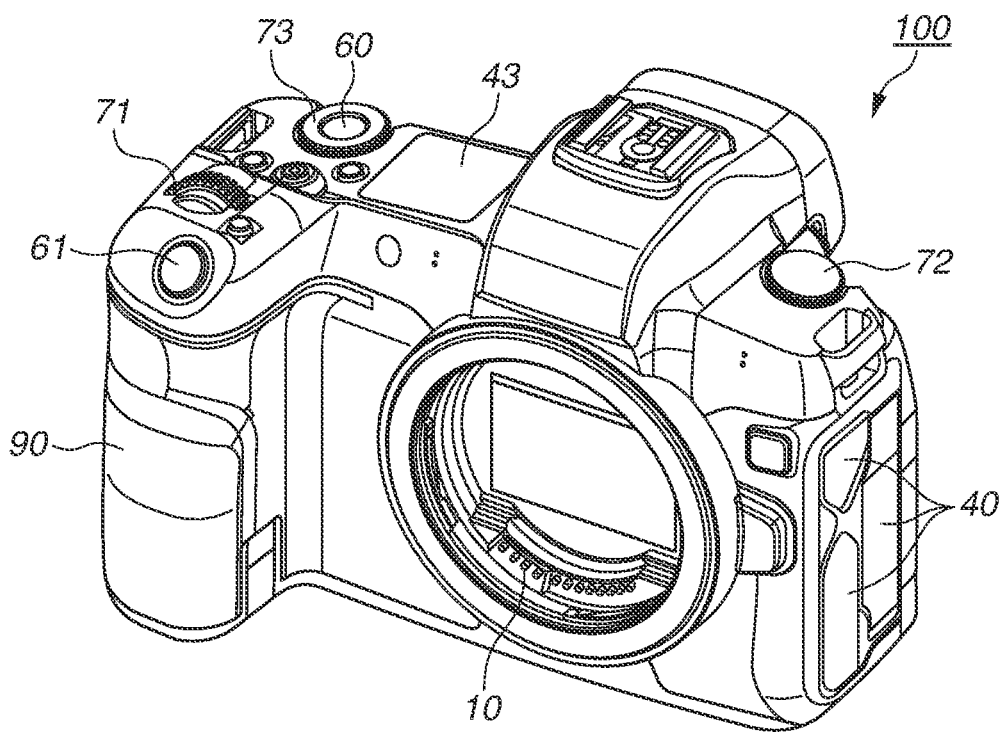
FIGS. 1A and 1B illustrate external views of a digital camera.
Figure 1B:
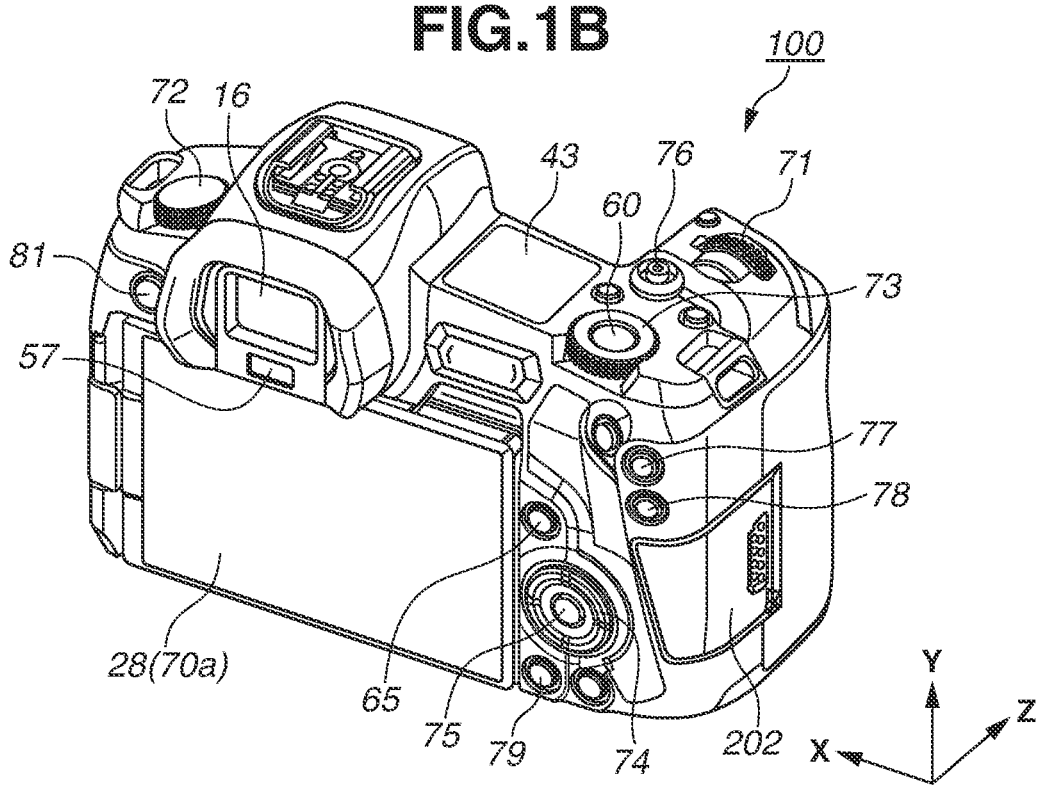

FIGS. 1A and 1B illustrate external views of a digital camera 100 as one example of an apparatus the present disclosure can be applied to. FIG. 1A illustrates a front face perspective view of the digital camera 100, and FIG. 1B illustrates a back face perspective view of the digital camera 100. In FIGS. 1A and 1B, a display unit 28 is arranged on a back face of the digital camera 100, and displays images and various types of information. A touch panel 70a is an operation member which is operable by touch operations and which detects a touch operation on the display surface (operation surface) of the display unit 28. An extra-viewfinder display unit 43 is a display unit arranged on the upper surface of the digital camera 100, and displays various setting values of the digital camera 100 such as a shutter speed and an aperture value thereon.

A shutter button 61 is an operation unit used in the input of image capturing instructions. In a still image capturing mode, the shutter button 61 is used in the input of image capturing preparation and image capturing instructions for still images. In a moving image capturing mode, the shutter button 61 is used in the input start instructions and end instructions for moving image capturing (recording). A mode changing switch 60 is an operation unit used in the change of various modes. A terminal cover 40 is a cover which protects a port (not illustrated) to connect the digital camera 100 to an external device via a connection cable. A main electronic dial 71 is a rotating operation member included in the operation unit 70, and a user can change setting values of a shutter speed and an aperture by rotating the main electronic dial 71. A power switch 72 is an operation member in switching a power ON/OFF state of the digital camera 100. A sub-electronic dial 73 is a rotating operation member included in the operation unit 70. The sub-electronic dial 73 is used in moving a selection frame and forwarding images. A cross key 74 is an operation member included in the operation unit 70 and including a push button pressable in four directions. The cross key 74 is operable based on the pressed direction. A set button 75 is a push button included in the operation unit 70 and is mainly used in determining on a selected item. A moving image button 76 is used in the input of start/end instructions of moving image capturing (recording). An AF-ON button 77 is included in the operation unit 70, and the user can start autofocus (AF) operation by pressing the AF-ON button 77. While the user starts the AF operation by mainly pressing the shutter button 61, the user can also input a start instruction of the AF operation by pressing the AF-ON button. If the digital camera 100 is a camera of a type which accepts a setting for disabling the shutter button 61 from starting the AF operation, an AF start instruction and an image capturing instruction can be input thereto through different buttons. If the shutter button 61 is pressed after a press of an auto-exposure (AE) lock button 78, image capturing can be performed under the condition with an AF position fixed or AF inoperable. The AF-ON button 77 is included in the operation unit 70, and pressing the AF-ON button 77 in an image capturing standby state allows an exposure state to be fixed, the image capturing standby state of which is a state where the digital camera 100 that has started image capturing through the imaging unit 22 in the image capturing mode stays ready without image capturing preparation. That allows the user to perform image capturing at a desired fixed exposure value. A play button 79 is an operation button included in the operation unit 70, and is used in shifting the image capturing mode to the play mode. The image capturing mode is shifted to the play mode in response to a press of the play button 79 in the image capturing mode, which allows the latest image to be displayed on the display unit 28 from among the images recorded in a recording medium 200. A menu button 81 is included in the operation unit 70, and a menu screen for performing various settings is displayed on the display unit 28 in response to a press of the menu button 81. A multi-controller 65 is an operation member including a direction key operable in eight directions and a push button that is pressable. The multi-controller 65 operable based on the pressed direction. The user can intuitively make various settings on the menu screen displayed on the display unit 28 with the cross key 74, the set button 75, and the multi-controller 65.

The operation unit 70 includes various operation members serving as input units for accepting operations performed by the user. The operation unit 70 includes a push button, a rotation dial, a touch sensor, and includes at least the following operation members: the shutter button 61, the touch panel 70a, the main electronic dial 71, the power switch 72, the sub-electronic dial 73, the cross key 74, the set button 75, the moving image button 76, the AF-ON button 77, the AE lock button 78, the play button 79, the menu button 81, and the multi-controller 65.

A communication terminal 10 is a communication terminal which allows the digital camera 100 to communicate with a lens unit 150 (i.e., a detachable lens unit) described below. An eyepiece portion 16 is the eyepiece portion of an eyepiece viewfinder (i.e., a look-in type viewfinder), and the user can visually recognize a video image displayed on an electronic viewfinder (EVF) 29 of an intra-viewfinder display unit via the eyepiece portion 16. An eyepiece detection unit 57 is an eyepiece detection sensor which detects whether a photographer's eye is in contact with the eyepiece portion 16. A cover 202 is a cover of a slot for storing the recording medium 200. A grip portion 90 is a holding portion formed into a shape to be easily grasped by a right hand when the user holds the digital camera 100. The shutter button 61 and the main electronic dial 71 are arranged at positions where the user can operate the shutter button 61 and the main electronic dial 71 with a right forefinger while the user grasps the grip portion 90 with a little finger, a fourth finger, and a middle finger of the right hand to hold the digital camera 100. The sub-electronic dial 73 is also arranged where the user can operate the sub-electronic dial 73 with a right thumb in the above-described state.

Figure 2:
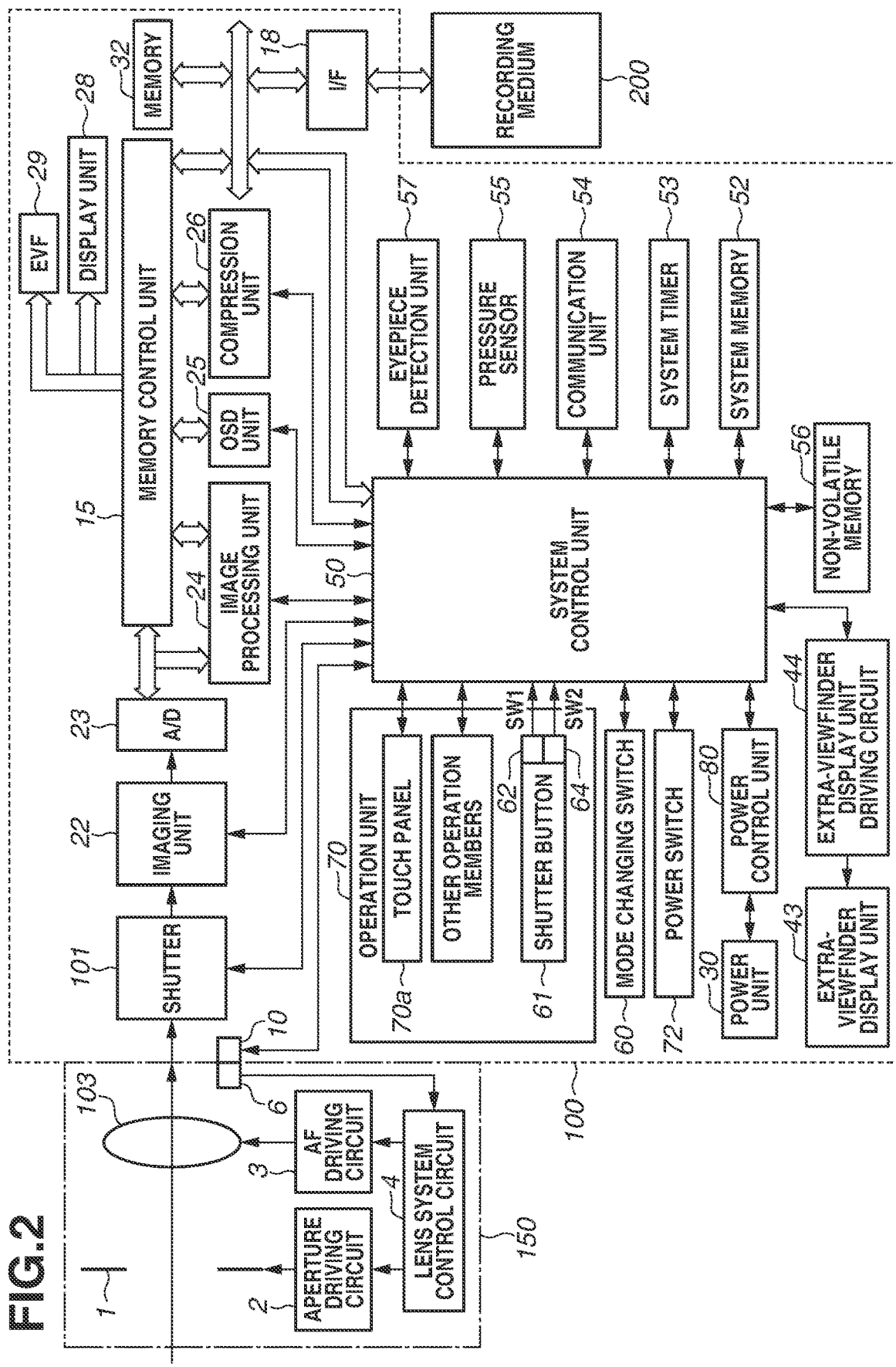
FIG. 2 is a block diagram illustrating a configuration of the digital camera.

FIG. 2 is a block diagram illustrating a configuration example of the digital camera 100 according to the present exemplary embodiment. In FIG. 2, a lens unit 150 includes an interchangeable lens mounted thereon. Herein, for the sake of simplicity, a lens 103 is illustrated as a single lens, although the lens 103 normally consists of a plurality of lenses. A communication terminal 6 enables the lens unit 150 to communicate with the digital camera 100. The lens unit 150 communicates with a system control unit 50 via the communication terminal 6 and the above-described communication terminal 10 to control an aperture 1 through an internal lens system control circuit 4 via an aperture driving circuit 2. Thereafter, the lens 103 is displaced and brought into an in-focus state via the AF driving circuit 3.

A shutter 101 is a focal-plane shutter capable of freely controlling the exposure time of the imaging unit 22 through the control performed by the system control unit 50.

The imaging unit 22 is an image sensor including a charge coupled device (CCD) sensor or a complementary metal oxide semiconductor (CMOS) sensor that converts an optical image into an electric signal. An analog-to-digital (A/D) conversion unit 23 is used for converting an analog signal output from the imaging unit 22 into a digital signal.

An image processing unit 24 performs resizing processing and color conversion processing such as predetermined pixel interpolation and data reduction on data output from the A/D conversion unit 23 or a memory control unit 15 described below. The image processing unit 24 further performs predetermined calculation processing with captured image data. Based on the calculation result acquired by the image processing unit 24, the system control unit 50 performs exposure control and range-finding control. Through the above-described configuration, AF processing using a through-the-lens (TTL) method, AE processing, and electronic flash pre-emission (EF) processing are performed. Furthermore, the image processing unit 24 performs predetermined calculation processing with captured image data, and performs auto-white balance (AWB) processing through the TTL method based on the acquired calculation result.

The memory control unit 15 controls transmission and reception of data between the A/D conversion unit 23, the image processing unit 24, and a memory 32. Data output from the A/D conversion unit 23 is directly written into the memory 32 via the image processing unit 24 and the memory control unit 15 or via the memory control unit 15. The memory 32 stores image data acquired by the imaging unit 22 and converted into digital data by the A/D conversion unit 23 and image data to be displayed on the display unit 28 or the EVF 29. The memory 32 has a storage capacity sufficient to store a predetermined number of still images and a predetermined time of moving image data or audio data.

The memory 32 also serves as a memory (video memory) used in displaying an image. The display image data written into the memory 32 is displayed on the display unit 28 and the EVF 29 via the memory control unit 15. Both the display unit 28 and the EVF 29 display an image on a display device such as a liquid crystal display (LCD) or an organic electro-luminescence (EL) display based on a signal output from the memory control unit 15. The digital camera 100 can perform live view display (LV display) by sequentially transmitting data converted by the A/D conversion unit 23 through A/D conversion and stored in the memory 32 to the display unit 28 or the EVF 29 and displaying the data thereon. Hereinafter, an image displayed in a live-view state is called "live view (LV) image".

An OSD unit 25 generates on-screen-display (OSD) data such as a menu display and an icon. The generated OSD data is written into the memory 32 via the memory control unit 15.

A compression unit 26 compresses temporally-continuous image data stored in the memory 32 through a method such as the Moving Picture Experts Group (Mpeg) method and generates moving image data. The generated moving image data is stored in the memory 32 via the memory control unit 15. Thereafter, the moving image data is multiplexed with audio data similarly stored in the memory 32, and written into the recording medium 200 as a moving image file.

Various setting values of the digital camera 100 including a shutter speed and an aperture value are displayed on an extra-viewfinder display unit 43 via an extra-viewfinder display unit driving circuit 44.

A non-volatile memory 56 is an electrically erasable/recordable memory. For example, an electrically erasable programmable read-only memory (EEPROM) is usable as the non-volatile memory 56. Constant numbers used in operating the system control unit 50 and programs are stored in the non-volatile memory 56. Herein, "programs" refers to programs for performing various types of processing illustrated in the below-described flowcharts according to the present exemplary embodiment.

The system control unit 50 is a control unit including at least one processor and/or at least one circuit, and generally controls the digital camera 100. The below-described various types of processing according to the present exemplary embodiment are performed by programs stored in the above-described non-volatile memory 56 being run. For example, a random access memory (RAM) is used as a system memory 52, and constant numbers and variable numbers used in operating the system control unit 50 and programs read from the non-volatile memory 56 are loaded on the system memory 52. The system control unit 50 further performs display control by controlling the memory 32, and the display unit 28.

A system timer 53 is a timer unit that measures time used in performing various types of control and time of a built-in clock.

The mode changing switch 60, the first shutter switch 62, the second shutter switch 64, and the operation unit 70 are operation units used in inputting instructions of various operations to the system control unit 50. The mode changing switch 60 changes the operation mode of the system control unit 50 to a still image recording mode, a moving image capturing mode, or a play mode. An auto-image capturing mode, an auto-scene determination mode, a manual mode, an aperture-prioritized mode (i.e., an aperture value (Av) mode), a shutter speed-prioritized mode (i.e., a time value (Tv) mode), and a program AE mode are included in the still image recording mode. Further, various scene modes and a custom mode used in performing image capturing of various imaging scenes are included in the still image recording mode. The user can directly change a mode to one of the above-described modes through the mode changing switch 60. Alternatively, after the user operates the mode changing switch 60 to change a screen to another screen displaying a list of image capturing modes, the user may select one of the modes displayed thereon to change a mode with another operation member. Similarly, a plurality of modes may be included in the moving image capturing mode.

The first shutter switch 62 is turned on and generates a first shutter switch signal SW1 in response to a half press of the shutter button 61 arranged on the digital camera 100, the shutter button 61 of which is halfway operated. With the first shutter switch signal SW1 generated, operations such as the below-described display processing is performed. In the still image capturing mode, a half press of the shutter button 61 causes the first shutter switch 62 to be turned on, and then image capturing preparation such as AF, AE, or AWB is performed based on the user setting.

A full press of the shutter button 61, which completes the operation of the shutter button 61, turns on the second shutter switch 64, and a second shutter switch signal SW2 is generated. With the second shutter switch signal SW2 generated, the system control unit 50 starts performing a series of processing from reading out a signal from the imaging unit 22 to writing image data in the recording medium 200. Further, the second shutter switch signal SW2 that is generated in moving image capturing operation causes the image capturing processing to be stopped.

The grip portion 90 has a shape to be easily grasped by the user, and made of a material which enables the user to firmly grasp the grip portion 90. In other words, the grip portion 90 is made of a material such as an easy-to-grasp rubber material having an uneven nonslip texture, which is different from the materials used for the other housing components of the digital camera 100. Because it is suitable that the shutter button 61 is arranged where the user can easily operate and press the shutter button 61 with the right forefinger while firmly grasping the grip portion 90, the shutter button 61 is arranged in the way while the lens unit 150 is grasped by the left hand. In FIG. 1A, the shutter button 61 is arranged on the upper surface of the digital camera 100, close to the grip portion 90 (i.e., on the right side of the EVF 29).

Further, another operation member may be used as long as the operation member accepts a two-phased instruction, not limited to the shutter button 61. The present exemplary embodiment can also be implemented even if the below-described touch operation member that detects a pressing force is arranged at the position of the shutter button 61 in FIG. 1A instead of a push button. In other words, a touch operation member that detects a pressing force, which is arranged at the position of the shutter button 61, can detect a first pressing force applied thereto to generate a signal similar to the signal. Further, the touch operation member can also generate a signal similar to the signal generated by the second shutter switch 64 by detecting a second pressing force stronger than the first pressing force. A different function may be activated at a different degree of pressing force applied to this touch operation member.

The user selects and operates various function icons displayed on the display unit 28 and appropriately allocates the functions to respective operation members of the operation unit 70, so that the respective operation members operates as various function buttons. For example, the operation members can operate as the function buttons such as an end button, a return button, an image forwarding button, a jump button, a depth-of-field preview button, and an attribute changing button. For example, when the menu button 81 is pressed, a menu screen used in making various settings is displayed on the display unit 28. The user can intuitively make various settings on the menu screen displayed on the display unit 28 with a four-direction (up, down, right, and left) button and a set button.

The operation unit 70 includes various operation members serving as input units for accepting the operations performed by the user. The operation unit 70 includes a push button, a rotation dial, a touch sensor, and at least the following operation members: the shutter button 61, the main electronic dial 71, the power switch 72, the sub-electronic dial 73, the cross key 74, the set button 75, the moving image button 76, the AF-ON button 77, the AE lock button 78, the play button 79, and the menu button 81.

A power control unit 80 includes a battery detection circuit, a direct current-to-direct current (DC-DC) converter, and a switching circuit for switching blocks to be energized, and detects attachment/non-attachment of a battery, a battery type, and a remaining battery power. Further, based on the detection result and the instruction from the system control unit 50, the power control unit 80 controls the DC-DC converter to supply power at an appropriate voltage to respective units including the recording medium 200 for an appropriate period. A power unit 30 includes a primary battery such as an alkaline battery or a lithium battery, or a secondary battery such as a nickel-cadmium (NiCd) battery, a nickel-metal hydride (NiMH battery, or a lithium-ion (Li) battery, and an alternating-current (AC) adapter.

A recording medium interface (I/F) 18 is an interface between the digital camera 100 and the recording medium 200 such as a memory card or a hard disk. The recording medium 200 is a recording medium such as a memory card for recording captured images and moving image data, which is a semiconductor memory or a magnetic disk.

A communication unit 54 is connected to an external device through wireless connection or a communication cable, and transmits and receives a video signal and an audio signal. The communication unit 54 can also be connected to a wireless local area network (LAN) and the internet. Further, the communication unit 54 can communicate with an external device through Bluetooth® or Bluetooth® Low Energy. The communication unit 54 can transmit images (including LV images) captured by the imaging unit 22 and images recorded in the recording medium 200, and can receive images and various types of information from an external device.

An eyepiece detection unit 57 is an eyepiece detection sensor which makes detection (approaching object detection) to detect approach (or contact) and withdrawal (or separation) of an eye (object) to and from the eyepiece portion 16 of the viewfinder. The system control unit 50 switches display (display state) and non-display (non-display state) of the display unit 28 and the EVF 29 depending on the condition detected by the eyepiece detection unit 57. More specifically, with the user's eye not in contact with the eyepiece portion 16, the system control unit 50 specifies the display unit 28 as a display destination and turns on the display if at least the digital camera 100 is in the image capturing standby state (recording standby state), and "Switch Automatically" is selected as a setting for switching a display destination of the live view image captured by the imaging unit 22. At this time, the EVF 29 is brought into a non-display state. Further, with the user's eye in contact with the eyepiece portion 16, the system control unit 50 specifies the EVF 29 as a display destination and turns on a display thereof, and turns off a display of the display unit 28. For example, with an infrared proximity sensor, the eyepiece detection unit 57 can detect approach of an object of some kind toward the eyepiece portion 16 of the viewfinder including the EVF 29. If an object approaches the eyepiece portion 16, infrared light emitted from a light projecting portion (not illustrated) of the eyepiece detection unit 57 is reflected on the object and received by a light receiving portion (not illustrated) of the infrared proximity sensor. Based on the quantity of received infrared light, the eyepiece detection unit 57 can determine how close the object is to the eyepiece portion 16 (i.e., the distance to the eyepiece portion 16). As described above, the eyepiece detection unit 57 makes eyepiece detection to detect the distance of the object approaching the eyepiece portion 16. If the approaching object within a predetermined distance of the eyepiece portion 16 is detected with the eyepiece portion 16 in a non-contact state (non-approached state), the eyepiece detection unit 57 detects the contact of the object (i.e., the eye). If the detected object that was close to the eyepiece portion 16 moves away by a predetermined distance or more with the eyepiece portion 16 in the contact state (approached state) the eyepiece detection unit 57 detects the separation of the object (i.e., the eye). For example, a threshold for detecting the contact of the eye and a threshold for detecting the separation of the eye can be specified separately by setting a hysteresis. Further, after the contact of the eye is detected, the eyepiece portion 16 is determined to be in the contact state until the separation of the eye is detected. After the separation of the eye is detected, the eyepiece portion 16 is determined to be in the non-contact state until the contact of the eye is detected. In addition, the infrared proximity sensor is a mere example. Another sensor may also be employed for the eyepiece detection unit 57 as long as the approach of the eye or the object, regarded as the contact of the eye, can be detected thereby.

As one of the operation members, the operation unit 70 also includes a touch panel 70a that detects contact with the display unit 28. The touch panel 70a and the display unit 28 can be configured integrally. For example, the touch panel 70a is configured so that light transmittance thereof does not interfere with display of the display unit 28, and attached to the upper layer of the display surface of the display unit 28. Then, input coordinates on the touch panel 70a are associated with display coordinates on the display screen of the display unit 28. That configuration provides a graphical user interface (GUI) that makes the user feel as if the user directly operate the screen displayed on the display unit 28. The system control unit 50 can detect the following state and operations performed on the touch panel 70a.

A state where a finger or a stylus pen that has not touched the touch panel 70a newly touches the touch panel 70a, i.e., the start of a touch (hereinafter, called "Touch-Down").

A state where the touch panel 70a is being touched with a finger or a stylus pen (hereinafter, called "Touch-On").

A state where a finger or a stylus pen is moving while touching the touch panel 70a (hereinafter, called "Touch-Move").

A state where a finger or a stylus pen that has touched the touch panel 70a is removed, i.e., the end of a touch (hereinafter, called "Touch-Up").

A state where neither a finger nor a stylus pen touches the touch panel 70a (hereinafter, called "Touch-Off").

Touch-On is detected simultaneously when Touch-Down is detected. Normally, Touch-On is detected continuously after detection of Touch-Down unless Touch-Up is detected. Touch-Move is also detected in a state where Touch-On is detected. Even if Touch-On is detected, Touch-Move will not be detected if the touched position is not changed. After all of the fingers or the stylus pen that is in contact with the touch panel 70a is removed to cause Touch-Up to be detected, the touch panel 70a is brought into Touch-Off.

The above-described operations and states, and position coordinates indicating the position where the finger or the stylus pen is in contact with the touch panel 70a are notified to the system control unit 50 through an internal bus. Based on the notified information, the system control unit 50 determines what kind of touch operation is performed on the touch panel 70a. With Touch-Move, based on the change of the position coordinates, the moving direction of the finger or the stylus pen moving on the touch panel 70a can also be determined for the vertical component and the horizontal component on the touch panel 70a. When Touch-Move of a predetermined distance or more is detected, the system control unit 50 determines that a sliding operation is performed. An operation for quickly moving a finger over a certain distance while touching the touch panel 70a and continuously removing that finger is called "Flick". In other words, "Flick" is an operation of the finger's flicking and sweeping the touch panel 70a quickly. When Touch-UP is detected immediately after a detection of Touch-Move with a predetermined distance or more and a predetermined speed or more, the system control unit 50 determines that Flick is performed (i.e., Flick is performed immediately after the sliding operation).

Further, a touch operation for simultaneously touching a plurality of points (e.g., two points) and moving the touched positions close to each other is called "Pinch-In", and a touch operation for moving the touched positions away from each other is called "Pinch-Out". "Pinch-Out" and "Pinch-In" are collectively called "pinch operation", or simply called "Pinch".

The touch panel of one of the following types, i.e., a resistive film type, an electrostatic capacitance type, a surface elastic wave type, an infrared type, an electromagnetic induction type, an image recognition type, and an optical sensor type, can be used as the touch panel 70a. Detection of a touch is made by detecting contact or approach of a finger or a stylus pen with respect to the touch panel depending the type, but the touch panel 70a can be of any one of the above-described types.

A pressure sensor 55 detects a pressing force applied to the operation surface of the display unit 28. The pressure sensor 55 can consecutively detect the degree of pressing force applied to the display unit 28 through the touch operation. As the pressure sensor 55, a strain gauge sensor may be arranged on a portion warped by the pressing force applied to the operation surface of the display unit 28, so that the pressing force applied to the operation surface of the display unit 28 can be detected based on the value output from the strain gauge sensor. Alternatively, the distance between the finger placed on the operation surface and the electrostatic capacitance sensor in the warp of the operation surface caused by a pressing force applied to the operation surface of the display unit 28 is calculated from the electrostatic capacitance value with an electrostatic capacitance sensor arranged parallel to the display unit 28. Then, the pressure is calculated based on the distance, or alternatively, the distance may be treated as equivalent to the pressure. In addition, the pressure sensor 55 can be a sensor of another type as long as the pressing force applied to the operation surface of the display unit 28 can be detected thereby. Further, the pressure sensor 55 may be integrated with the touch panel 70a.

A first exemplary embodiment will be described. Control processing for displaying information on the display unit 28 will be described with reference to FIG. 3. This processing is performed when the user operates the shutter button 61 with the digital camera 100 in a moving image recording standby state in which the live view image captured by the imaging unit 22 is displayed on the display unit 28. Specifically, in response to a half press of the shutter button 61, the system control unit 50 performs control to display file information about a moving image file to be recorded. In addition, the file information described in the present exemplary embodiments (i.e., both the first exemplary embodiment and a second exemplary embodiment to be described below) includes a file name, a recording start date/time, and a file format.

Figure 3:
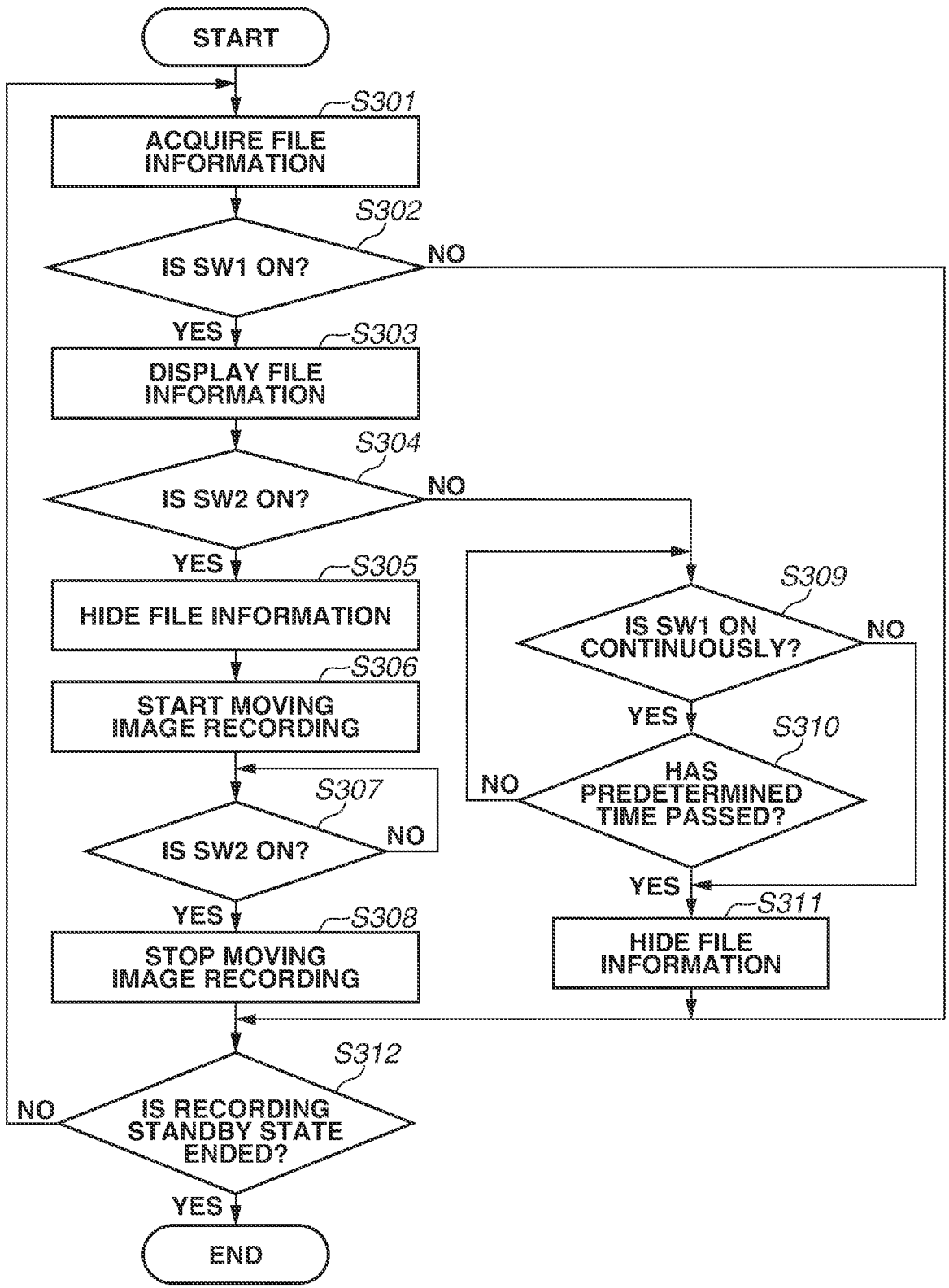
FIG. 3 is a flowchart illustrating display control processing in a moving image recording mode according to a first exemplary embodiment.

FIG. 3 is a flowchart illustrating control processing started with a live view image captured by the imaging unit 22 and the OSD data other than the file information such as a time code displayed and with the digital camera 100 activated by the user by the power being turned on in a recording standby state in a moving image recording mode. This control processing is performed by the system control unit 50 loading programs stored in the non-volatile memory 56 on the system memory 52 and running the programs. FIG. 4B-1 illustrates an example of an image displayed in a recording standby state, i.e., a state before moving image recording is started, in which the shutter button 61 has not been operated by the user.

In step S301, the system control unit 50 acquires file information about a moving image file to be recorded and stored in the memory control unit 15 (i.e., file information to be applied in response to an input of a start instruction of moving image recording next time).

In step S302, the system control unit 50 determines whether the first shutter switch 62 is turned on. If the first shutter switch 62 is turned on (YES in step S302), the processing proceeds to step S303. Otherwise (NO in step S302), the processing proceeds to step S312.

In step S303, the system control unit 50 displays the file information on the display unit 28. Specifically, the system control unit 50 controls the OSD unit 25 to generate OSD data about file information (e.g., file name) used when the user inputs a start instruction of moving image recording. The generated OSD data about the file information is stored in the memory 32. The generated OSD date about the file information is superimposed on the LV image displayed on the display unit 28. A display example of the above-described LV image is illustrated in FIG. 4B-2.

In step S304, the system control unit 50 determines whether the second shutter switch 64 is turned on. If the second shutter switch 64 is turned on (YES in step S304), the processing proceeds to step S305. Otherwise (NO in step S304), the processing proceeds to step S309.

In step S305, the system control unit 50 hides the file information displayed on the display unit 28 in step S303. Specifically, the system control unit 50 controls the OSD unit 25 to generate OSD data that does not include the file information. The generated OSD data is superimposed on the LV image stored in the memory 32 and displayed on the display unit 28. In response to a start instruction of moving image recording input by the user, specifically, in response to a full-press of the shutter button 61, the system control unit 50 hides the file information displayed in step S303. The control performed as described above before the user starts recording a moving image enables the user to visually check the file information about a file where the moving image is to be saved after being recorded. Further, the file information is hidden in response to the start of the moving image recording. This configuration enables the user to visually check the LV image of the moving image the user has started recording without being interrupted by the file information.

In step S306, the system control unit 50 starts moving image recording. In other words, the system control unit 50 controls the compression unit 26 to compress the image data stored in the memory 32 to generate moving image data, creates a moving image file in the recording medium 200, and records the moving image captured by the imaging unit 22 based on the current settings. The generated moving image data is stored in the memory 32 via the memory control unit 15, multiplexed with audio data similarly stored in the memory 32, and written into the recording medium as a moving image file. The system control unit 50 further stores the file information displayed in step S303 in the memory 32. An example of the image displayed in the above-described state is illustrated in FIG. 4B-3.

In step S307, similarly to the processing in step S304, the system control unit 50 determines whether the second shutter switch 64 is turned on. If the second shutter switch 64 is turned on (YES in step S307), the processing proceeds to step S308. Otherwise (NO in step S307), the processing returns to step S307.

In step S308, the system control unit 50 stops the moving image recording. After the moving image recording is stopped, processing for closing the moving image file created in the recording medium 200 (i.e., processing for applying attribute information) is performed. At this time, the recorded moving image is saved in the moving image file indicated by the file information displayed in step S303.

If the result of determination made in step S304 is "NO", in step S309, the system control unit 50 determines whether the first shutter switch 62 is turned on continuously. If the first shutter switch 62 is turned on continuously (YES in step S309), the processing proceeds to step S310. Otherwise (NO in step S309), the processing proceeds to step S311.

In step S310, the system control unit 50 determines whether a predetermined time has passed. If a predetermined time has passed (YES in step S310), the processing proceeds to step S311. Otherwise (NO in step S310), the processing returns to step S309. For example, a predetermined time in step S310 is a period of approximately 3 seconds. On the other hand, if the first shutter switch 62 that has been turned on in step S302 is turned off within a period less than 1 second, the file information displayed in step S303 will not be hidden immediately. The file information is hidden if the passage of the predetermined time is determined in step S310. This control allows the user to sufficiently and visually check the file information even if the half-press of the shutter button 61 is ended quickly. If the above-described predetermined time has passed in step S310, in step S311, the system control unit 50 hides the file information displayed in step S303, similarly to the processing in step S305. Then, the processing proceeds to step S312. If the user does not fully press the shutter button 61 (i.e., the user does not input a start instruction of moving image recording) after pressing the shutter button 61 halfway, the system control unit 50 hides the file information after a predetermined time passes. Further, if the half-press of the shutter button 61 is ended (when the shutter button 61 is brought into a non-operated state), the system control unit 50 also hides the file information. This control allows the user who wishes to check the LV image to visually check the LV image without being interrupted by the file information after passage of the predetermined time, even if the shutter button 61 is being pressed halfway.

The processing illustrated in the flowchart involves making a determination whether to display the file information depending on whether a predetermined time has passed (i.e., depending on whether the condition for hiding the file information is satisfied). However, the present exemplary embodiment is not limited thereto. In other words, the processing in step S310 may be skipped, so that the processing proceeds to step S311 from step S309. This control allows continuous display of the file information while the user is halfway pressing the shutter button 61 (while the ON state of the first shutter switch 62 is detected continuously). In this way, if the user wishes to hide the file information, the user may fully press the shutter button 61 or cancel the half-press thereof, so that display/non-display of the file information can be controlled according to the user's intention.

In step S312, the system control unit 50 determines whether the recording standby state is ended. For example, if the recording standby state is ended when the user turns off the power of the digital camera 100 or presses the play button 79 or the menu button 81 (YES in step S312), the control processing illustrated in FIG. 3 is ended. Otherwise (NO in step S312), the processing returns to step S301.

Figure 4A:
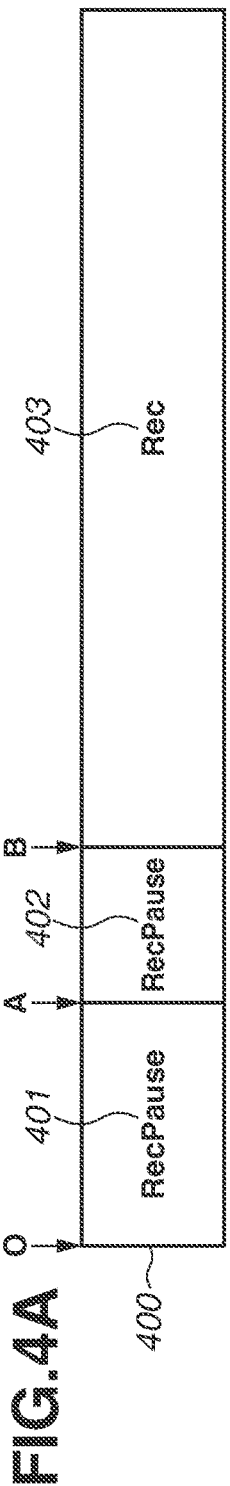
Figures 2, 4B:
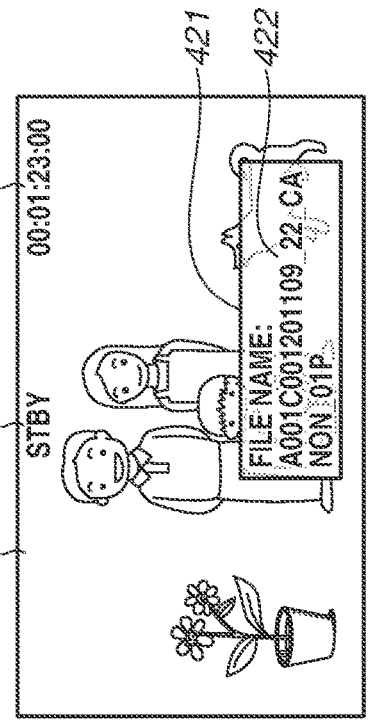
Figures 1, 4B:
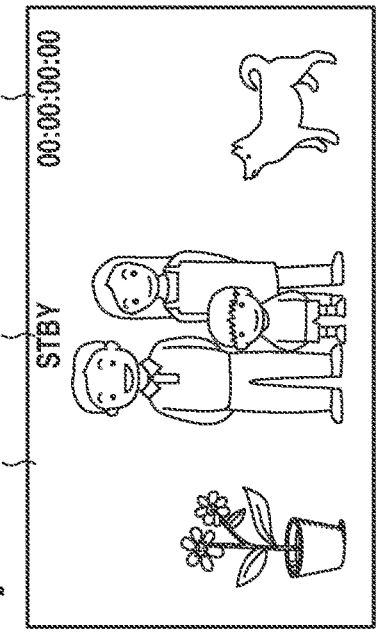
Figures 3, 4B:
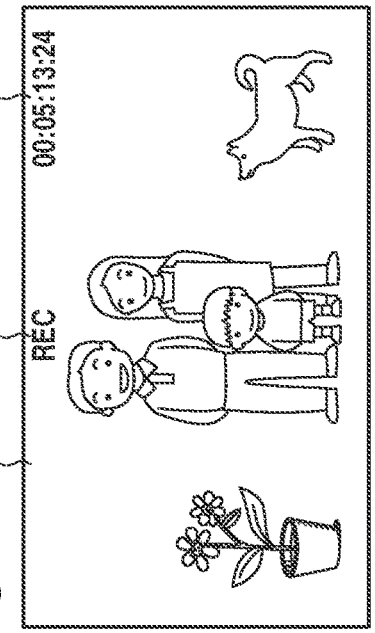

FIG. 4A and FIGS. 4B-1 to 4B-3 illustrate an internal state of the digital camera 100 and examples of images displayed on the display unit 28 when the control processing illustrated in FIG. 3 is performed. FIG. 4A is a sequence diagram illustrating an internal state of the digital camera 100, and FIGS. 4B-1 to 4B-3 illustrate examples of images displayed on the display unit 28.

A sequence 400 in FIG. 4A illustrates an internal state of the digital camera 100 related to moving image recording. A state 401 illustrates a recording standby state (RecPause). In the state 401, an image illustrated in FIG. 4B-1 is displayed on the display unit 28. A display item 411 and a time 412 are displayed together with an LV 410. The display item 411 illustrates the current state of moving image recording, and the time 412 illustrates a time code (time: minute: second: frame). In FIG. 4B-1, the display item 411 is displayed as "STBY", which indicates a recording standby state, and the time 412 is displayed as "00:00:00:00". At the time point in FIG. 4B-1, the user inputs a start instruction of moving image recording, so that the time 412 is counted up from the state of the time code "00:00:00:00" (i.e., numerical values are incremented from the time point recording is started). The time 412 is not always a time code or a count-up display, and the time 412 can optionally be set by the user. For example, before moving image recording is started, the time 412 may constantly be displayed as "0 min." instead of a time code, and the time 412 is counted up in response to the start of moving image recording. Further, that amount of time that can be spent for the moving image recording, which is acquired from the remaining capacity of the recording medium 200 or an external recording device, may be displayed thereon, and the time is counted down in response to the start of the moving image recording.

When the user halfway presses the shutter button 61 at a time point A in FIG. 4A to cause the system control unit 50 to detect the ON state of the first shutter switch 62 (YES in step S302 in FIG. 3), the internal state is shifted to a state 402, i.e., a recording state standby state (RecPause). When the user halfway presses the shutter button 61 to cause the internal state to be shifted to the state 402, an image illustrated in FIG. 4B-2 is displayed on the display unit 28. A display item 423 and a time 424 are displayed on the display unit 28 together with an LV 420. The display item 423 illustrates an internal state of the digital camera 100. Similarly to the display item 411 in FIG. 4B-1, the display item 423 is also displayed as "STBY", which indicates a recording standby state. The time 424 is displayed as "00:01:23:00". Based on the time 424, it is found that the first shutter switch 62 is turned on at the point of time when 1 minute and 23 seconds passes from a time point 0 at which the state 401 is started after the time code is reset. A dialogue box 421 illustrates file information to be applied when moving image recording is started next time. Although the internal state of the digital camera 100 is not changed even if the state 401 is shifted to the state 402, different items are displayed on the display unit 28. In the state 401, the dialogue box 421 is not displayed. However, in the state 402, the dialogue box 421 is displayed, and file information 422 is displayed inside the dialogue box 421. Further, the dialogue box 421 is displayed in a translucent state. That maintains partial visual recognition of the LV image even with the dialogue box 421 superimposed on the LV image displayed on the display unit 28. Even if the dialogue box 421 is superimposed on the LV image for a predetermined period of time, the user is less likely to be bothered thereby.

When the user fully presses the shutter button 61 at a time point B in FIG. 4A to cause the system control unit 50 to detect the ON state of the second shutter switch 64, the internal state is shifted to a state 403 (Rec). In the state 403, the internal state of the digital camera 100 is a moving image recording state. At this time, as illustrated in FIG. 4B-3, a display item 431 and a time 432 are displayed on the display unit 28 together with an LV 430. The display item 431 is displayed as "REC" indicating a state where moving image recording is being performed. At this time, the dialogue box 421 including the file information 422, as illustrated in FIG. 4B-2, is not displayed thereon. The time 432 indicates that 5 minutes 13 seconds and 24 frames have passed from a time point 0 in FIG. 4B-1.

As described above with reference to FIG. 3, FIG. 4A, and FIGS. 4B-1 to 4B-3, in response to a half-press of the shutter button 61 performed by the user before moving image recording is started (i.e., in response to detection of the ON state of the first shutter switch 62), file information about a moving image to be recorded is displayed on the display unit 28. This control allows the user to figure out the file in which a moving image is to be saved before recording of the moving image is started, which enables the user to find the file without difficulty while recording is being performed or after the recording is ended. Further, if the half-press of the shutter button 61 is continuously performed for a predetermined time, the file information displayed at the start of the half-press is hidden even if that user operation is being performed continuously. On the other hand, if the half-press of the shutter button 61 is ended immediately after the start, the file information is continuously displayed until the predetermined time has passed. This control enables the user to sufficiently and visually check the displayed file information before moving image recording is started, and prevents the user from being bothered by the file information displayed thereon. Further, in response to the half-press of the shutter button 61, file information about the moving image being recorded may be displayed on the display unit 28 while recording is being performed, in addition to when moving image recording is started.

A second exemplary embodiment will be described. In the first exemplary embodiment, when the ON state of the first shutter switch 62 is detected, the processing for displaying file information alone is performed. In the present exemplary embodiment, when the ON state of the first shutter switch 62 is detected, processing for starting recording is performed together with the processing for displaying the file information.

Control processing for displaying file information about a moving image file to be recorded on the display unit 28 and also starting moving image recording, which is performed when the user operates the shutter button 61 while the digital camera 100 is recording a moving image, will be described with reference to FIG. 5.

Figure 5:
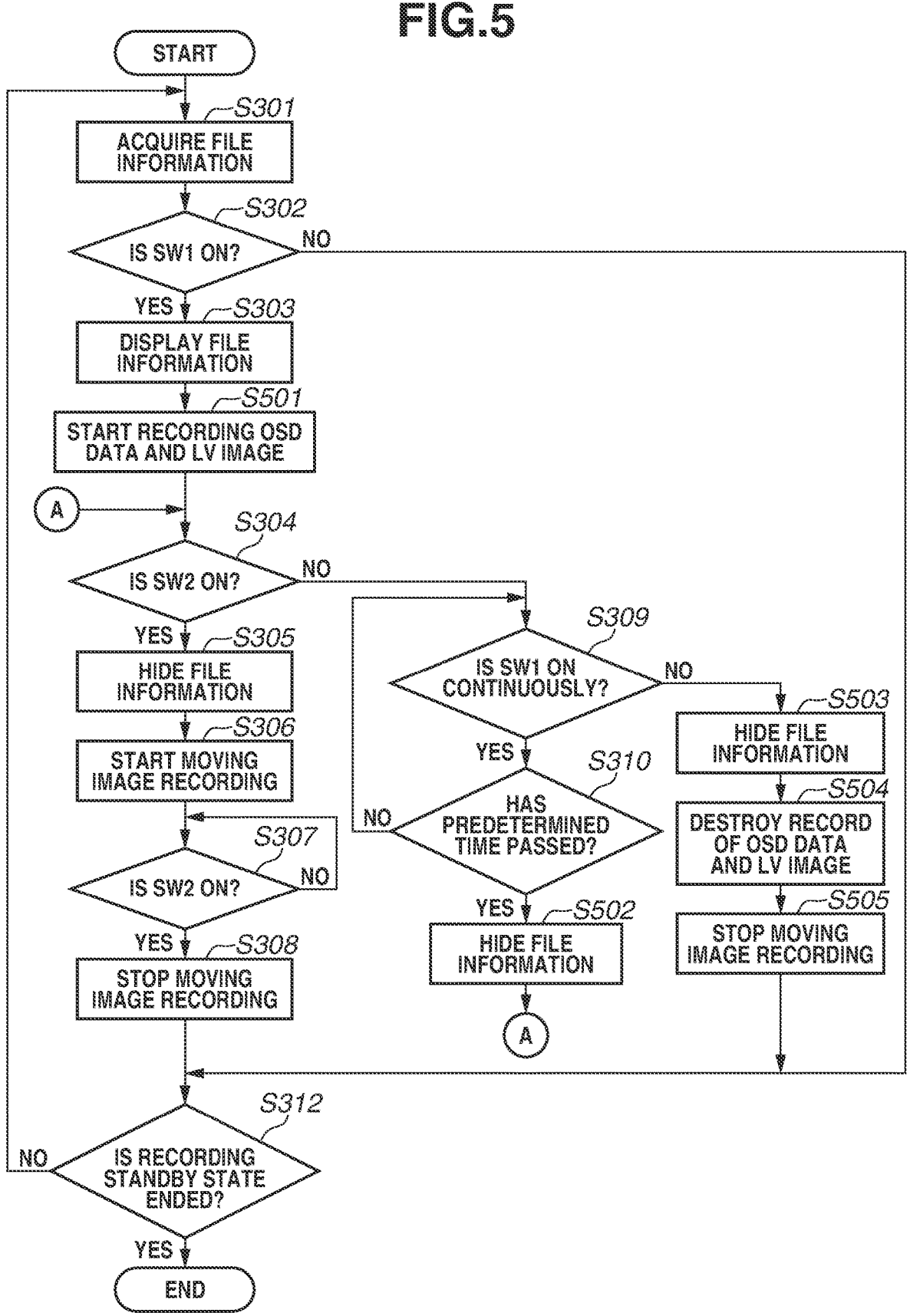
FIG. 5 is a flowchart illustrating display control processing in a moving image recording mode according to a second exemplary embodiment.

FIG. 5 is a flowchart illustrating the control processing started in the recording standby state in the moving image recording mode after the digital camera 100 is activated by the user by turning on the power. This control processing is performed by the system control unit 50 loading programs stored in the non-volatile memory 56 on the system memory 52 and running the programs. In the control processing in FIG. 5, like numbers refer to like processing steps of the control processing illustrated in FIG. 3.

In step S501, the system control unit 50 records the file information displayed in step S303, OSD data about the file information, and the LV image. In other words, the system control unit 50 records a moving image in which the file information is superimposed on the LV image.

In step S502, the system control unit 50 hides the file information displayed in step S303. Then, the processing returns to step S304, i.e., the step subsequent to step S501.

If the determination result acquired in step S309 is "NO", in step S503, the system control unit 50 hides the file information displayed in step S303.

In step S504, the system control unit 50 destroys (deletes) the OSD display including the file information and the LV image recorded in the memory in step S501. This control prevents a useless file from being generated if the user erroneously touches the first shutter switch 62.

In step S505, the system control unit 50 stops moving image recording. After the moving image recording is stopped, processing for closing the moving image file created in the recording medium 200 (i.e., processing for applying attribute information) is performed.

In addition, the system control unit 50 displays the file information described in step S303 if the user halfway presses the shutter button 61 to cause the system control unit 50 to detect the ON state of the first shutter switch 62 while the control processing in steps S305 and S306 is being performed based on the determination result of "YES" in step S304 of FIG. 5. However, OSD data including file information and a LV image described in step S501 will not be recorded. This control prevents the user from unintentionally performing useless recording while the user is performing moving image recording with the shutter button 61 fully pressed (turns on the second shutter switch 64).

FIG. 6A and FIGS. 6B-1 to 3B-3 illustrate an internal state of the digital camera 100 and examples of images displayed on the display unit 28 when the control processing illustrated in FIG. 5 is performed. FIG. 6A illustrates an internal state of the digital camera 100, and FIGS. 6B-1 to 6B-3 illustrate examples of images displayed on the display unit 28.

A sequence 600 in FIG. 6A illustrates the internal state of the digital camera 100 related to moving image recording. A state 601 illustrates a recording standby state (RecPause). In the state 601, the shutter button 61 is not operated. An example of the image displayed on the display unit 28 in the state 601 is illustrated in FIG. 6B-1. A display item 611 and a time 612 are displayed together with an LV 610. The display item 611 illustrates the current state of moving image recording, and the time 612 illustrates a time code (time: minute: second: frame). In FIG. 6B-1, the display item 611 is displayed as "STBY", which indicates a recording standby state, and the time 612 is displayed as "00:00:00:00". At the time point in FIG. 6B-1, the user inputs a start instruction of moving image recording, so that the time 612 is counted up from the state of the time code "00:00:00:00" (i.e., numerical values are incremented from the time point recording is started). The time 612 is not always a time code or a count-up display, and similarly to the case of the time 412 described in the first exemplary embodiment, the time 612 can optionally be set by the user.

When the user halfway presses the shutter button 61 at a time point A in FIG. 6A to cause the first shutter switch 62 to be turned on, the internal state is shifted to a state 602, i.e., a recording state (Rec) of the OSD data and the LV image. If the determination result acquired in step S302 of FIG. 5 is "YES", the internal state is shifted to the state 602. When the user halfway presses the shutter button 61 to cause the internal state to be shifted to the state 602, an image illustrated in FIG. 6B-2 is displayed on the display unit 28. A dialogue box 621, a display item 623 and a time 624 are displayed on the display unit 28 together with an LV 620. The display item 623 illustrates an internal state of the digital camera 100. The state 602 is different from the state 601. In other words, the internal state of the digital camera 100 is changed to a recording state of the OSD data and the LV image from the recording standby state. Different from the display item 611 illustrated in FIG. 6B-1, the display item 623 is displayed as "<REC>". At this time, the digital camera 100 merely records the LV image captured by the imaging unit 22 and displayed on the display unit 28 together with the OSD data, although recording of the OSD data superimposed on the LV image and the LV image displayed on the display unit 28 is started. In other words, the digital camera 100 is merely performing screen-capturing of the OSD data (including file information) and the LV image displayed on the display unit 28. Thus, this recording is different from the below-described moving image recording started in response to a detection of the ON state of the second shutter switch 64. Specifically, settings such as a recording image quality and a compression format applied to the recording performed in the state 602 are different from settings which the user has applied to the moving image recording started in the state 603. Thus, the display item 623 is displayed in a display method different from the method used for displaying the display item 631 in FIG. 6B-3.

The time 624 is displayed as "00:01:23:00". Based on the time 624, it is found that the first shutter switch 62 is turned on when 1 minute and 23 seconds has passed from a time point 0 at which the state 601 is started after the time code is reset. File information 622 is displayed in the dialogue box 621. The file information 622 illustrates the file information to be applied when moving image recording is started next time.

Further, as described in the first exemplary embodiment, similarly to the state of the dialogue box 421, the dialogue box 621 is also displayed in a translucent state. This prevents the LV image from being hidden completely even if the dialogue box 621 is superimposed on the LV image.

Based on the fact that the internal state of the digital camera 100 is changed when the state 602 is shifted to the state 603, different items are displayed on the display unit 28. In the state 602, the dialogue box 621 including the file information 622 is displayed. However, in the state 603, the dialogue box 621 including the file information 622 is not displayed (i.e., the file information 622 is hidden).

When the second shutter switch 64 is turned on at a time point B in FIG. 6A, the state 602 is shifted to the state 603 (Rec). In the state 603, the internal state of the digital camera 100 related to moving image recording is a moving image recording state. At this time, as illustrated in FIG. 6B-3, a display item 631 and a time 632 are displayed on the display unit 28 together with an LV 630. The display item 631 is displayed as "REC", which indicates a recording state of a moving image. As described above, the display item 631 is displayed in a display method different from the method used for displaying the display item 623. The time 632 indicates that 5 minutes 13 seconds and 24 frames have passed from a time point 0 in FIG. 6B-1.

As described above, in response to a detection of the ON state of the first shutter switch 62, file information is displayed on the display unit 28, and the OSD data including the file information and the LV image are recorded. In response to a detection of the ON state of the second shutter switch 64, the file information is hidden, and the recording of the OSD data and the LV image (i.e., so-called screen capture) is stopped. Thereafter, based on the recording image quality and the compression format set by the user, moving image recording of the LV image captured via the imaging unit 22 is started. This control causes file information to be embedded as video data at the beginning of the moving image data itself. Thus, the user can check the file information together with the image when a list of thumbnails using first images of moving images is displayed thereon. In a movie studio, a so-called clapperboard which describes imaging information may be captured at the beginning of a scene. In this case, a clapperboard is captured while the first shutter switch 62 is being kept in an ON state, and the second shutter switch 64 is turned on after the clapperboard is captured. That allows an easy distinction between the captured clapperboard used for identifying a scene and a captured main scene. In other words, that allows a clearer distinction between a captured image used for identifying a scene and a captured main scene based on a pressing state (phase) of the shutter button 61. Thus, the start position of the scene can easily be recognized when the user plays the recorded moving image later.

In addition, although display processing on the file information has been described in the above-described exemplary embodiments (both of the first and the second exemplary embodiments), the present disclosure is not limited thereto. Metadata about an index (e.g., shot-mark) which indicates a time point at which the first shutter switch 62 is turned on may be added to a file of the recorded moving image in addition to a display of the file information. By adding the shot-mark, when the user edits the recorded moving image by using editing software after recording the moving image, the states before and after the start of the actual moving image recording caused by the full press of the shutter button 61 can easily be distinguished from each other. Specifically, a state after a detection of the ON state of the first shutter switch 62 (i.e., a state after the start of preliminary moving image recording before start of actual moving image recording) and a state after a detection of the ON state of the second shutter switch 64 (i.e., a state after recording of a main moving image is started) can easily be distinguished from each other.

Further, in the above-described exemplary embodiments, with a moving image recording state (i.e., state 403 or 603) as the internal state shifted in response to detection of the ON state of the second shutter switch 64, the system control unit 50 performs control to hide the file information. However, the present disclosure is not limited thereto. If the user halfway presses the shutter button 61 for a short period of time, i.e., if the first shutter switch 62 is turned on for a short period of time, the file information displayed on the display unit 28 may be hidden before the user sufficiently and visually checks the file information. In order to reduce occurrences of the above-described issue, for example, with the state 403 or 603 shifted from the state 402 or 602 within a period less than a certain period (e.g., 1 sec.), the file information is continuously displayed. In the state 603, the OSD data is not superimposed thereon. Thereafter, the file information may be hidden if the passage of a predetermined time is determined in step S310. This configuration prevents the user from missing an opportunity of checking the file information, and prevents the visibility of the displayed moving image from being lowered by the file information while moving image recording is being performed. Further, after recording of the moving image is started in response to a detection of the ON state of the second shutter switch 64, the moving image on which the file information (OSD data) is superimposed is not recorded even if the file information is displayed continuously, and the normal moving image (i.e., moving image without superimposed file information) is recorded. Further, similarly to the first exemplary embodiment, in response to a detection of the ON state of the first shutter switch 62, the file information may be displayed on the display unit 28 while recording is being performed, as well as before recording is started. In this case, it is suitable that the moving image is recorded without having the superimposed file information.

Further, in the present exemplary embodiment, although the file information is displayed on the display unit 28, similar display control may also be performed on a video image and OSD data transmitted to an external device via the communication unit 54. Further, control processing may be performed to display the file information on the display unit 28 or an external device. For example, if the user wishes to check the file information through an external terminal alone via a network, while mainly using the display unit 28 for checking a video image as an image capturing target, the file information is superimposed on the video image alone transmitted to the external terminal through the communication unit 54, and is not displayed on the display unit 28. Alternatively, control may be performed to transmit and display OSD data including the file information on the external terminal (not illustrated) that receives the information.

Further, in the present exemplary embodiment, the file information is displayed on the display unit 28 in response to a half press of the shutter button 61, i.e., a detection of the ON state of the first shutter switch 62. However, the file information may be displayed on the EVF 29 in addition to the display unit 28. Furthermore, a constituent element such as a high-definition multimedia interface (HDMI) (registered trademark) or a serial digital interface (SDI) for outputting video image data to an external device, which is connected thereto through wired or wireless connection, may be added to the digital camera 100, and similar display control may be performed on the external device. Further, the file information may be displayed on the display unit 28 or the external device.

Further, the above-described various types of control described as the processing performed by the system control unit 50 may be performed by a piece of hardware, and the apparatus may be generally controlled by a plurality of pieces of hardware (e.g., a plurality of processors and circuits) by sharing the processing.

Furthermore, the present disclosure is applicable to a control apparatus which communicates with an imaging apparatus (including a network camera) and remotely controls the imaging apparatus through wired or wireless communication, as well as to an imaging apparatus main body. Apparatuses such as a smartphone, a tablet personal computer (PC), and a desktop PC are given as examples of the control apparatus which remotely controls the imaging apparatus. Based on the operation or processing performed on the control apparatus, the control apparatus can remotely control the imaging apparatus by transmitting commands for causing the imaging apparatus to perform various operations and settings. Further, the control apparatus may receive the live view image captured by the imaging apparatus through wired or wireless communication to display the live view image thereon.

While the present disclosure has been described in detail with reference to the exemplary embodiments, the present disclosure is not limited to the above-described specific exemplary embodiments, and many variations which do not depart from the spirit of the present disclosure are also included within the scope of the present disclosure. Further, each of the above-described embodiments merely illustrates one exemplary embodiment of the present disclosure, and the exemplary embodiments can be combined as appropriate.

Further, in the above-described exemplary embodiments, the present disclosure is applied to a digital camera. However, the present disclosure is not limited thereto, and is applicable to a device that includes an imaging function and an operation member operable by a two-phased operation. In other words, the present disclosure is also applicable to a mobile phone terminal, a mobile type image viewer, a smartphone, a tablet terminal, a music player, a game machine, and an electronic book reader.

Other Exemplary Embodiment

The present disclosure is also implemented by performed the following processing. In other words, software (program) that carries out the functions described in the present exemplary embodiments is supplied to a system or an apparatus via a network or various storage media, so that a computer (or a CPU or a micro-processing unit (MPU)) of the system or the apparatus reads out and runs a program code. In this case, the program and a storage medium storing that program are also included in the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-130636, filed Aug. 10, 2021, which is hereby incorporated by reference herein in its entirety.

What is claimed is:

1. An imaging apparatus comprising:
   an imaging unit;
   a shutter button used for inputting a moving image capturing instruction configured to be operated by an operation in a first phase and an operation in a second phase, wherein the first phase corresponds to a half-press of the shutter button and the second phase corresponds to a full-press of the shutter button;
   a recording control unit configured to record a moving image captured by the imaging unit in a moving image file in response to an operation performed on the shutter button; and
   a control unit configured to perform control to display file information about a moving image file to be recorded by the recording control unit in response to performance of the operation in the first phase, and to hide the file information that is displayed in response to a performance of the operation in the first phase, in response to performance of the operation in the second phase.

2. The imaging apparatus according to claim 1, wherein the recording control unit does not start recording of a moving image in a state where the operation in the first phase is being performed, and starts recording of a moving image in response to the performance of the operation in the second phase.

3. The imaging apparatus according to claim 1, wherein the recording control unit performs control to start recording of a moving image in response to the performance of the operation in the first phase, and to superimpose the file information on the moving image captured by the imaging unit and record the moving image while the operation in the first phase is being performed.

4. The imaging apparatus according to claim 3, wherein the recording control unit destroys the moving image on which the file information is superimposed in a state where the operation in the second phase is not performed after the operation in the first phase is performed.

5. The imaging apparatus according to claim 1, wherein the control unit controls so that a display item indicating a state of recording of a moving image started in response to the operation in the first phase and display item indicating a state of recording of the moving image after the operation in the second phase is performed are displayed in different display forms.

6. The imaging apparatus according to claim 1, wherein the control unit hides the file information in response to when a predetermined condition is satisfied after the operation in the first phase is performed.

7. The imaging apparatus according to claim 6, wherein the predetermined condition is at least one of a condition that a predetermined time has passed since the operation in the first phase was performed or a condition that the operation in the second phase is performed before the predetermined time has passed since the operation in the first phase was performed.

8. The imaging apparatus according to claim 1, wherein the control unit performs control to hide the file information in a case where the operation in the first phase is performed in a state where recording of the moving image is being performed, and
   wherein the recording control unit stops recording of the moving image in response to the operation in the second phase performed in a state where recording of the moving image is being performed.

9. The imaging apparatus according to claim 1, wherein the control unit superimposes and displays a dialogue box including the file information on the moving image captured by the imaging unit.

10. The imaging apparatus according to claim 1, wherein the file information is a file name.

11. The imaging apparatus according to claim 1, wherein the file information is a recording start date and time of the moving image file or a file format of the moving image file.

12. A control method for an imaging apparatus including an imaging unit and a shutter button configured to be operated by an operation in a first phase and an operation in a second phase deeper than in the first phase, wherein the first phase corresponds to a half-press of the shutter button and the second phase corresponds to a full-press of the shutter button, the control method comprising:
   recording a moving image captured by the imaging unit in a moving image file in response to an operation performed on the shutter button; and
   performing control to display file information about a moving image file recorded by the recording in response to performance of an operation in the first phase, and to hide the file information that is displayed in response to the performance of the operation in the first phase, in response to performance of an operation in the second phase is performed.

13. A non-transitory computer-readable storage medium that stores a program for causing a computer to execute a control method for an imaging apparatus including an imaging unit and a shutter button configured to be operated by an operation in a first phase and an operation in a second phase, wherein the first phase corresponds to a half-press of the shutter button and the second phase corresponds to a full-press of the shutter button the control method comprising:
   recording a moving image captured by the imaging unit in a moving image file in response to an operation performed on the shutter button; and
   performing control to display file information about a moving image file recorded by the recording in response to performance of an operation in the first phase, and to hide the file information that is displayed in response to the performance of the operation in the first phase, in response to performance of an operation in the second phase is performed.

* * * * *